(12) United States Patent
Adkisson

(10) Patent No.: US 6,864,722 B2
(45) Date of Patent: Mar. 8, 2005

(54) PHASE DETECTOR FOR A PROGRAMMABLE CLOCK SYNCHRONIZER

(75) Inventor: Richard W. Adkisson, Dallas, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 50 days.

(21) Appl. No.: 10/630,298

(22) Filed: Jul. 30, 2003

(65) Prior Publication Data

US 2004/0222857 A1 Nov. 11, 2004

Related U.S. Application Data

(60) Provisional application No. 60/469,120, filed on May 9, 2003.

(51) Int. Cl.⁷ ............................................. H03D 13/00
(52) U.S. Cl. ......................................... 327/12; 327/2
(58) Field of Search ....................... 327/2, 3, 5, 7–10, 327/12

(56) References Cited

U.S. PATENT DOCUMENTS

| | | |
|---|---|---|
| 5,347,559 A | 9/1994 | Hawkins et al. |
| 5,721,886 A | 2/1998 | Miller |
| 5,923,190 A * | 7/1999 | Yamaguchi .................. 327/12 |
| 6,075,832 A | 6/2000 | Geannopoulos et al. |
| 6,084,934 A | 7/2000 | Garcia et al. |
| 6,114,915 A | 9/2000 | Huang et al. |
| 6,134,155 A | 10/2000 | Wen |
| 6,175,603 B1 | 1/2001 | Chapman et al. |
| 6,246,275 B1 | 6/2001 | Wodnicki et al. |
| 6,249,875 B1 | 6/2001 | Warren |
| 6,326,824 B1 | 12/2001 | Hosoe et al. |
| 6,369,624 B1 | 4/2002 | Wang et al. |
| 6,529,083 B2 | 3/2003 | Fujita |
| 6,577,694 B1 * | 6/2003 | Meghelli ..................... 375/373 |
| 6,614,314 B2 * | 9/2003 | d'Haene et al. ............. 331/1 A |
| 6,707,319 B2 * | 3/2004 | Yoshimura ................ 327/12 |
| 2002/0051509 A1 | 5/2002 | Lindner et al. |
| 2002/0158671 A1 | 10/2002 | Wang et al. |
| 2002/0199124 A1 | 12/2002 | Adkisson |

* cited by examiner

Primary Examiner—David Mis

(57) ABSTRACT

A phase detector in a programmable clock synchronizer for effectuating data transfer between first circuitry disposed in a first clock domain and second circuitry disposed in a second clock domain. The phase detector includes a series of flip flops disposed in parallel that sample the second clock signal with both a rising edge of the first clock signal and a falling edge of the first clock signal. By tracking movement in one-to-zero or zero-to-one transitions in the sampled clock signals, the phase detector is operable to determine the phase difference between the first and second clock signals.

21 Claims, 3 Drawing Sheets

PHASE DETECTOR FOR A PROGRAMMABLE CLOCK SYNCHRONIZER

PRIORITY UNDER 35 U.S.C. §119(e) & 37 C.F.R. §1.78

This nonprovisional application claims priority based upon the following prior United States provisional patent application entitled: "Programmable Clock Synchronizer and Controller Arrangement Therefor," application Ser. No. 60/469,120, filed May 9, 2003, in the name(s) of: Richard W. Adkisson, which is hereby incorporated by reference.

CROSS-REFERENCE TO RELATED APPLICATION(S)

This application discloses subject matter related to the subject matter disclosed in the following commonly owned co-pending patent applications: (i) "Programmable Clock Synchronizer," filed Jul. 30, 2003; application Ser. No. 10/630,159, in the name(s) of: Richard W. Adkisson; (ii) "Controller Arrangement for a Programmable Clock Synchronizer," filed Jul. 30, 2003; application Ser. No. 10/630,182 in the name(s) of: Richard W. Adkisson; (iii) "System and Method for Synchronizing Multiple Synchronizer Controllers," filed Jul. 30, 2003; application Ser No. 10/629,989, in the name(s) of: Richard W. Adkisson; (iv) "System and Method for Maintaining a Stable Synchronization State in a Programmable Clock Synchronizer," filed Jul. 30, 2003; application Ser. No. 10/630,297, in the name(s) of: Richard W. Adkisson; and (v) "System and Method for Compensating for Skew Between a First Clock Signal and a Second Clock Signal," filed Jul. 30, 2003; application Ser. No. 10/630,317, in the name(s) of: Richard W. Adkisson, all of which are incorporated by reference herein.

BACKGROUND

Digital electronic systems, e.g., computer systems, often need to communicate using different interfaces, each running at an optimized speed for increased performance. Typically, multiple clock signals having different frequencies are utilized for providing appropriate timing to the interfaces. Further, the frequencies of such clock signals are generally related to one another in a predetermined manner. For example, a core or system clock running at a particular frequency ($F_C$) may be utilized as a master clock in a typical computer system for providing a time base with respect to a specific portion of its digital circuitry. Other portions of the computer system's digital circuitry (such as a bus segment and the logic circuitry disposed thereon) may be clocked using timing signals derived from the master clock wherein the derived frequencies ($F_D$) follow the relationship: $F_C/F_D \geq 1$.

Because of the asynchronous—although related—nature of the constituent digital circuit portions, synchronizer circuitry is often used in computer systems to synchronize data transfer operations across a clock domain boundary so as to avoid timing-related data errors. Such synchronizer circuitry is typically required to possess low latency (which necessitates precise control of the asynchronous clocks that respectively clock the circuit portions in two different clock domains). Typically, phase-locked loops (PLLs) are utilized in conventional synchronizer circuitry arrangements to produce clocks of different yet related frequencies. The PLLs may have a large amount of input/output (I/O) jitter that results in low frequency phase difference, or skew, between different clocks of the synchronizer circuitry. Accordingly, it is essential to determine the skew between different clocks of the synchronizer circuitry.

SUMMARY

A phase detector is disclosed that provides for detecting phase in a programmable clock synchronizer for effectuating data transfer between first circuitry disposed in a first clock domain and second circuitry disposed in a second clock domain. The phase detector includes a series of flip flops disposed in parallel that sample the second clock signal with both a rising edge of the first clock signal and a falling edge of the first clock signal. By tracking movement in one-to-zero or zero-to-one transitions in the sampled clock signals, the phase detector is operable to determine the phase difference between the first and second clock signals.

DETAILED DESCRIPTION OF THE DRAWINGS

Figure 1:
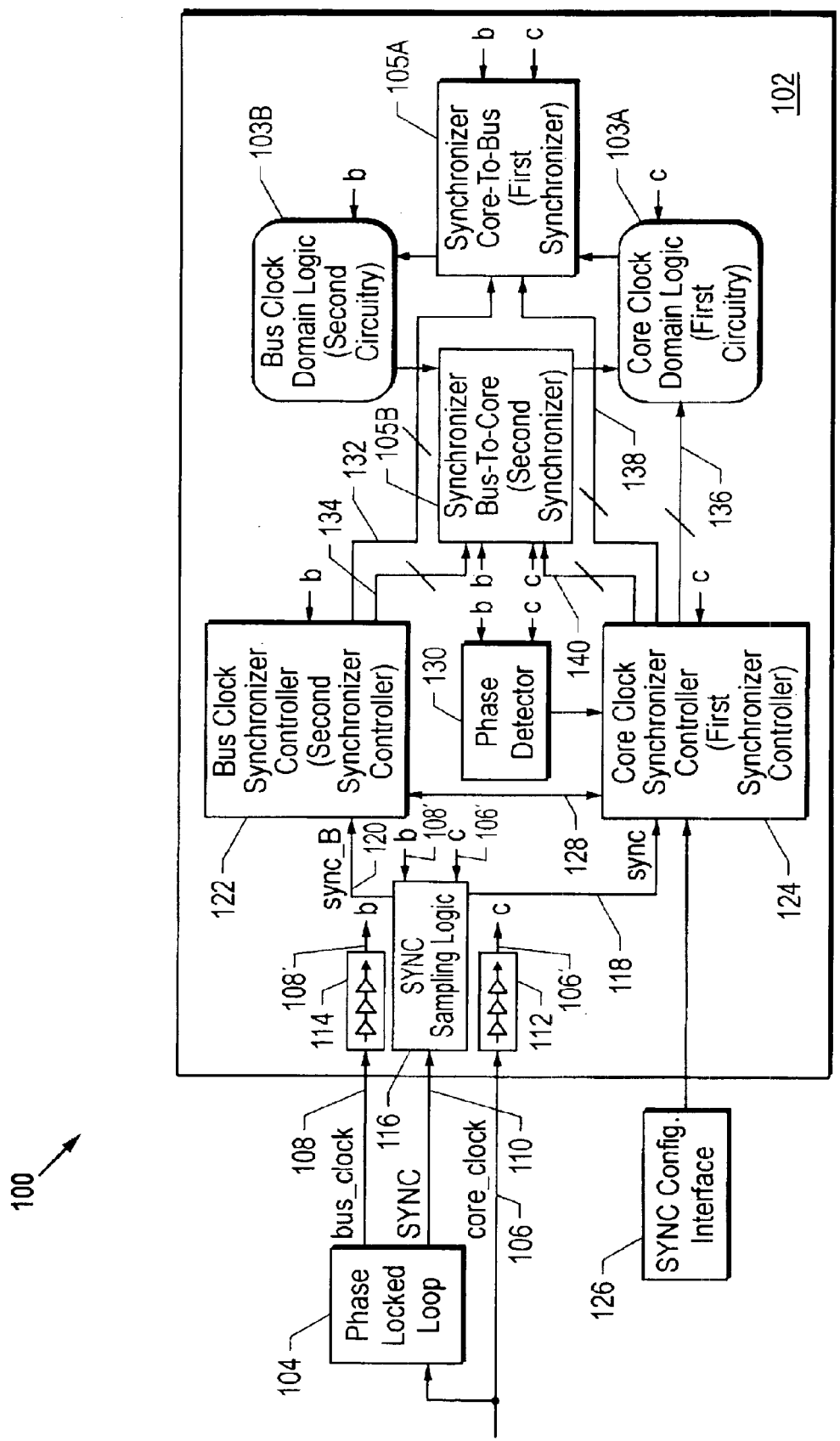
FIG. 1 depicts a block diagram of an embodiment of a programmable synchronizer system for effectuating data transfer across a clock boundary.

In the drawings, like or similar elements are designated with identical reference numerals throughout the several views thereof, and the various elements depicted are not necessarily drawn to scale. Referring now to FIG. 1, therein is depicted an embodiment of a programmable synchronizer system 100 for effectuating data transfer across a clock boundary between a first clock domain (i.e., "fast clock domain") having N clock cycles and a second clock domain (e.g., "slow clock domain") having M clock cycles such that N/M>1. Typically, M=(N−1), and by way of exemplary implementation, the synchronizer system 100 may be provided as part of a computer system for transferring data between a faster core clock domain (e.g., operating with a core clock signal of 250 MHz) and a slower bus clock domain (e.g., operating with a bus clock signal of 200 MHz), with a 5:4 frequency ratio. Accordingly, for purposes of this present patent application, the terms "first clock" and "core clock" will be used synonymously with respect to a fast clock domain; likewise, the terms "second clock" and "bus clock" will be used with respect to a slow clock domain.

A phase-locked loop (PLL) circuit 104 is operable to generate a SYNC pulse 110 and a bus clock (i.e., second clock) signal 108 (designated as bus_clock) based on a core clock (i.e., first clock) signal 106 (designated as core_clock) provided thereto. As will be seen below, the SYNC pulse 110 provides a reference point for coordinating data transfer operations and is driven HIGH when the bus_clock and core_clock signals have coincident rising edges. The two clock signals 106, 108 and SYNC pulse 110 are provided to a synchronizer/controller block 102 that straddles the clock boundary between a first clock domain (i.e., core clock domain) and a second clock domain (i.e., bus clock domain) for effectuating data transfer across the boundary. Reference numerals 103A and 103B refer to circuitry disposed in the first and second clock domains, respectively, e.g., core clock domain logic and bus clock domain logic, that transmit and receive data therebetween as facilitated via synchronizers 105A and 105B, which will be described in greater detail hereinbelow.

Each of the core_clock and bus_clock signals 106, 108 is first provided to a respective clock distribution tree block for generating a distributed clock signal that is provided to various parts of the synchronizer/controller block 102. Reference numeral 112 refers to the clock distribution tree operable with the core_clock signal 106 to generate the distributed core_clock signal, which is labeled as "c" and shown with reference numeral 106' in FIG. 1. Likewise, reference numeral 114 refers to the clock distribution tree 114 operable with the bus_clock signal 108 to generate the distributed bus_clock signal, which is labeled as "b" and shown with reference numeral 108' in FIG. 1. As one skilled in the art should readily recognize, the distributed clock signals are essentially the same as the input clock signals. Accordingly, the core_clock signal 106 and its distributed counterpart c 106' are treated equivalently hereinafter. Also, the bus_clock signal 108 and its distributed counterpart b 108' are similarly treated as equivalent.

A SYNC sampling logic block 116 is operable responsive to the distributed clock signals 106', 108' and SYNC pulse signal 110, to generate a pair of sampled SYNC pulses that are forwarded to appropriate synchronizer controller circuitry. In one embodiment, the sampled SYNC pulses are manufactured as follows. The SYNC pulse 110 is sampled twice by two flip flop (FF) elements (not shown in FIG. 1) that are clocked on the rising edge of the distributed core_clock, c 106'. As may be appreciated, sampling by two FF elements is effective in eliminating metastability associated with the SYNC pulse 110 (possibly arising due to the skew between the input signal, core_clock 106 and the output signal, SYNC 110). The twice-sampled SYNC pulse is designated as "sync" signal 118 in FIG. 1, which is provided to a first synchronizer controller (or, core clock synchronizer controller) 124 operating in the first clock domain.

With respect to the second clock domain (i.e., bus clock domain), the SYNC pulse 110 is sampled in the SYNC sampling logic block 116 by a single FF element (not shown in this FIG.) that is clocked on the rising edge of the distributed bus_clock, b 108'. To signify that the sampling is done using the bus_clock, the sampled SYNC pulse is designated as "sync_B" signal 120, which is provided to a second synchronizer controller 122 operating in the second clock domain, also referred to as the bus clock synchronizer controller in FIG. 1.

The bus clock synchronizer controller 122 is operable responsive to the distributed bus_clock, b 108', and sampled sync_B pulse 120 to generate a plurality of synchronizer control signals, a portion of which signals are directed to a first synchronizer circuit means 105A operating to control data transfer from first circuitry 103A (i.e., core clock domain logic) to second circuitry 103B (i.e., bus clock domain logic). Reference numeral 132 refers to the signal path of this portion of control signals emanating from the bus clock synchronizer controller 122. Another portion of the synchronizer control signals generated by the bus clock synchronizer controller 122 are directed (via signal path 134) to a second synchronizer circuit means 105B operating to control data transfer from second circuitry 103B to first circuitry 103A. Consistent with the nomenclature used in the present patent application, the first and second synchronizer circuits may also be referred to as core-to-bus synchronizer and bus-to-core synchronizer circuits, respectively. In addition, the bus clock synchronizer controller 122 also generates a set of inter-controller control signals that are provided to the first synchronizer controller 124 (i.e., core clock synchronizer controller) such that both controllers can work together. Reference numeral 128 refers to the signal path of the inter-controller control signal(s) provided to the core clock synchronizer controller 124.

Similar to the operation of the bus clock synchronizer controller 122, the core clock synchronizer controller 124 is operable responsive to the distributed core_clock, c 106', inter-controller control signals and sampled sync pulse 118 to generate a plurality of synchronizer control signals, a portion of which signals are directed to the first synchronizer circuit means 105A and another portion of which signals are directed to the second synchronizer circuit means 105B. Reference numerals 138 and 140 refer to the respective signal paths relating to these control signals. The core clock synchronizer controller 124 also generates data transmit/receive control signals that are provided to the core clock domain logic 103A via signal path 136 in order that the core clock domain logic 103A knows when it can send data to the bus clock domain logic 103B (i.e., valid TX operations) and when it can receive data from the bus clock domain logic 103B (i.e., valid RX operations).

All control signals from the bus clock synchronizer controller 122 to the first and second synchronizers 105A, 105B are staged through one or more FF elements that are clocked with the distributed bus_clock, b 108'. Likewise, the control signals from the core clock synchronizer controller 124 are staged through a number of FF elements clocked with the distributed core_clock, c 106', before being provided to the various parts of the synchronizer system 100. Accordingly, as will be seen in greater detail below, the various control signals associated with the synchronizer system 100 may be designated with a signal label that is concatenated with a "_ff" or "_ff_B" suffix to indicate the registration process by the distributed core_clock or the distributed bus_clock.

Moreover, as will be set forth in detail below, a phase detector 130 detects phase differences (i.e., skew) between the two clock signals by operating responsive to the sampled bus_clock and core_clock signals. This information is provided to the core clock synchronizer controller 124, which can compensate for the skew or determine appropriate times to coordinate with the bus clock synchronizer controller 122.

Where the bus clock signal is stable with respect to the SYNC pulse, the inter-controller clock relationship control signals are generated by the bus clock synchronizer controller 122 that provide information as to the frequency ratio of the first and second clock signals, clock sequence information and SYNC delay, which are transmitted to the core clock synchronizer controller 124 for synchronizing its core clock signal in accordance therewith. On the other hand, where the core clock signal is stable with respect to the SYNC pulse, the inter-controller clock relationship control signals are generated by the core clock synchronizer controller 124 for transmission to the bus clock synchronizer 122 so that both synchronizer controllers may be appropriately synchronized. Further, a configuration interface 126, labeled as SYNC_Config in FIG. 1, is provided as part of the programmable synchronizer system 100 for configuring the core clock synchronizer controller 124 so that it may be programmed for different skew tolerances, latencies and modes of operation. In one embodiment, the configuration interface 126 may be implemented as a register having a plurality of bits. In another embodiment, a memory-based setting, e.g., EPROM-stored settings, may be provided as a SYNC configuration interface.

Additional details regarding the various sub-systems described hereinabove may be found in the following commonly owned co-pending patent applications: (i) "Programmable Clock Synchronizer," filed Jul. 30, 2003; application Ser. No. 10/630,159, in the name(s) of: Richard W. Adkisson; (ii) "Controller Arrangement for a Programmable Clock Synchronizer," filed Jul. 30, 2003; application Ser. No. 10/630,182, in the name(s) of: Richard W. Adkisson; (iii) "System and Method for Synchronizing Multiple Synchronizer Controllers," filed Jul. 30, 2003; application Ser. No. 10/629,989, in the name(s) of: Richard W. Adkisson; (iv) "System and Method for Maintaining a Stable Synchronization State in a Programmable Clock Synchronizer," filed Jul. 30, 2003; application Ser. No. 10/630,297, in the name(s) of: Richard W. Adkisson; and (v) "System and Method for Compensating for Skew Between a First Clock Signal and a Second Clock Signal," filed Jul. 30, 2003; application Ser. No. 10/630,317, in the name(s) of: Richard W. Adkisson, all of which are incorporated by reference herein.

As set forth above and in the cross-referenced U.S. patent applications, the synchronizer system 100 may be programmed for different skew tolerances and latencies, so that data transfer at high speeds can proceed properly even where there is a high skew or requirement of low latency. Further, the synchronizer system 100 can operate with any two clock domains having a ratio of N first clock cycles to M second clock cycles, where $N/M \geq 1$.

Figure 2:
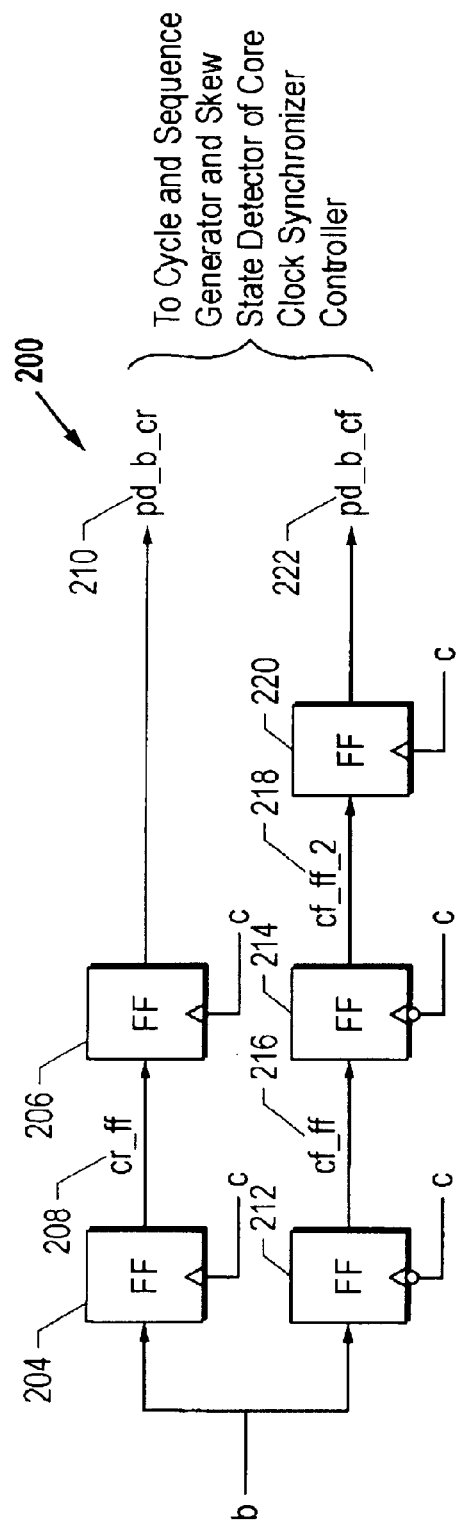
FIG. 2 depicts a schematic diagram of one embodiment of a phase detector.

FIG. 2 depicts one embodiment of a phase detector 200 operable to detect phase differences between the clocks used in the synchronizer system 100. Accordingly, it is functionally analogous to the phase detector block 130 shown in FIG. 1. In general, the phase detector 200 employs the rising and falling edges of the core_clock c 106' to sample the bus_clock b 108'. In one implementation, the bus_clock b 108' is sampled by at least one first flip flop (FF) clocked on the rising edge of the core_clock c 106. As illustrated, flip flops 204 and 206 sample the bus_clock b 108' with the rising edge of the core_clock c 106'. By employing two flip flops for sampling, the phase detector 200 is operable to decrease metastability. Flip flop 204 asserts the sampled bus_clock b 108' signal as a cr_ff signal 208 which is sampled by the flip flop 206 and asserted as a pd_b_cr signal 210.

Similarly, the bus_clock b 108' is sampled by at least one second flip flop clocked on the falling edge of the core_clock c 106'. A third flip flop may be employed in conjunction with the at least one second flip flop to maintain timing. As illustrated, flip flops 212 and 214 sample the bus_clock b 108' with the falling edge of the core_clock c 106' (to reduce metastability). Flip flop 212 asserts the sampled bus_clock b 108' signal as a cf_ff signal 216 which is sampled and asserted by the flip flop 214 as a cf_ff_2 signal 218. A flip flop 220 samples the cf_ff_2 signal with the rising edge of the core_clock c 106' to ensure timing and asserts a pd_b_cf signal 222.

Upon detecting coincident rising edges between the core_clock c 106' signal and bus_clock b 108' signal, either the cr_ff 208 signal will include a one-to-zero transition or the cf_ff signal 216 will include a zero-to-one transition. The phase detector 200 described herein detects phase differences or skew between the clock signals by monitoring and tracking the movement of the one-to-zero and zero-to-one transitions, which in turn depends on the movement of the coincident rising edges of the clock signals. In the illustrated embodiment, the phase detector 200 uses flip flops, as opposed to delay units, in order to minimize latency. It should be appreciated, however, that the phase detector 200 may comprise a variety of digital logic components. Moreover, although the phase detector 200 is described in relation to positive logic, negative logic may also be employed to determine the phase difference.

The pd_b_cr signal 210 and the pd_b_Cf signal 222 are forwarded to the core clock synchronizer controller 124 and, in particular, a cycle and sequence generator and a skew state detector of the core clock synchronizer controller 124 in order to compensate for skew. The cycle and sequence generator and skew state detector receive the pd_b_or signal 210 and the pd_b_cf signal 222 by registering the signals several times and detecting a one-to-zero transition on the pd_b_cr registers or a zero-to-one transition on the pd_b_cf registers. The detection may be registered N+1 times, wherein, for example, N+1 is 5 if 5:4 is the largest ratio detected. Taps are selected off the registers and the "zero tap" is selected from these registers depending on the sync_ratio signal provided by the bus clock synchronizer controller 122. Typically, the zero point is asserted by the skew state detector as a pd_z signal. Further information regarding the pd_b_cr and pd_b_cf signals in relation to the core clock synchronizer controller may be found in the aforementioned U.S. patent applications entitled "System and Method for Maintaining a Stable Synchronization State in a Programmable Clock Synchronizer," filed Jul. 30, 2003; application Ser. No. 10/630,297, in the name(s) of: Richard W. Adkisson; and "System and Method for Compensating for Skew Between a First Clock Signal and a Second Clock Signal," filed Jul. 30, 2003; application Ser. No. 10/630,317, in the name(s) of: Richard W. Adkisson.

Figure 3:
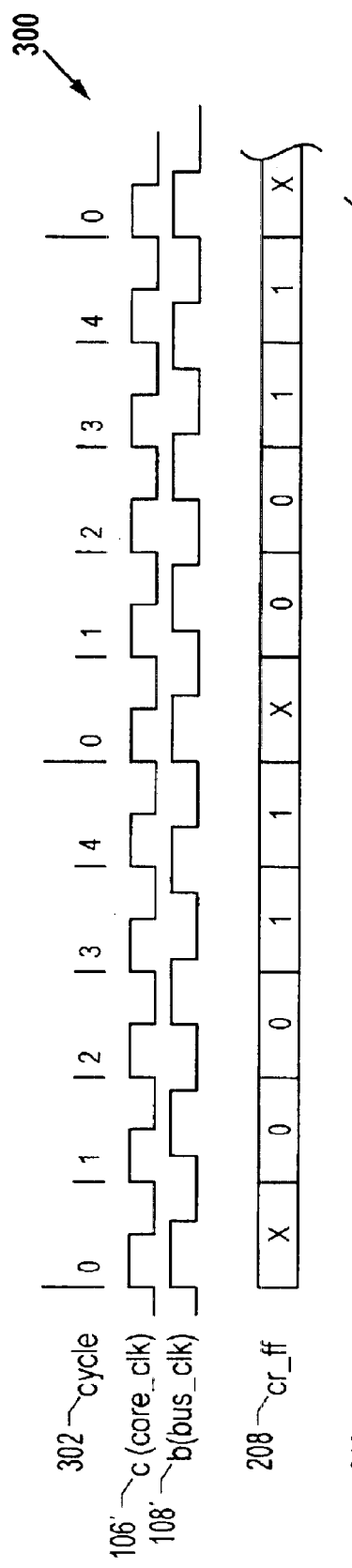
FIG. 3 depicts a timing diagram associated with a portion of the phase detector embodiment of FIG. 2.

FIG. 3 depicts a timing diagram 300 associated with a portion of the phase detector embodiment 200 of FIG. 2, wherein a clock frequency ratio of 5:4 is exemplified. A cycle count 302 refers to the numbering of core_clock cycles in a particular timing sequence. In particular, the timing diagram 300 illustrates the output of the first rising edge flip flop, i.e., the cr_ff signal 208, and first falling edge flip flop, i.e., the cf_ff signal 216, at the core-to-bus frequency ratio of 5:4. As illustrated, the output of the cr_ff signal 208 and the cf_ff signal 216 includes data blocks comprising 0s, 1s, or indeterminate logic states.

As previously discussed, following the coincident edges of the core clock signal 106' and the bus clock signal 108', the one-to-zero transition appears on the cr_ff signal 208 or the zero-to-one transition appears on the cf_ff signal 216. In the illustrated embodiment, the zero-to-one transition is located on the cf_ff signal 216 upon the occurrence of the coincident edges of the core_clock c 106' and the bus_clock b 108' at cycle 0, as indicated by the zero-to-one transition markers "$T_{0-1}$." The location of the transitions in the sampled clock signals, i.e., pd_b_cr 210 and pd_b_cf 222, is, therefore, indicative of where the coincident edges of the clock signals occur in the clock cycle sequence, which in turn is dependent on the phase difference between the clock signals. The phase detector accordingly provides an indication of the skew between the core_clock c 106' and the bus_clock b 108' by monitoring and tracking the movement of the $T_{0-1}$ or $T_{1-0}$ transitions in the sampled clock signals. Further, as explained in the aforementioned co-pending U.S. patent applications, the detected transitions are used by the core clock synchronizer controller circuitry to generate appropriate skew states based on the movement of the coincident edges of the clocks and their ratio.

Figure 4:
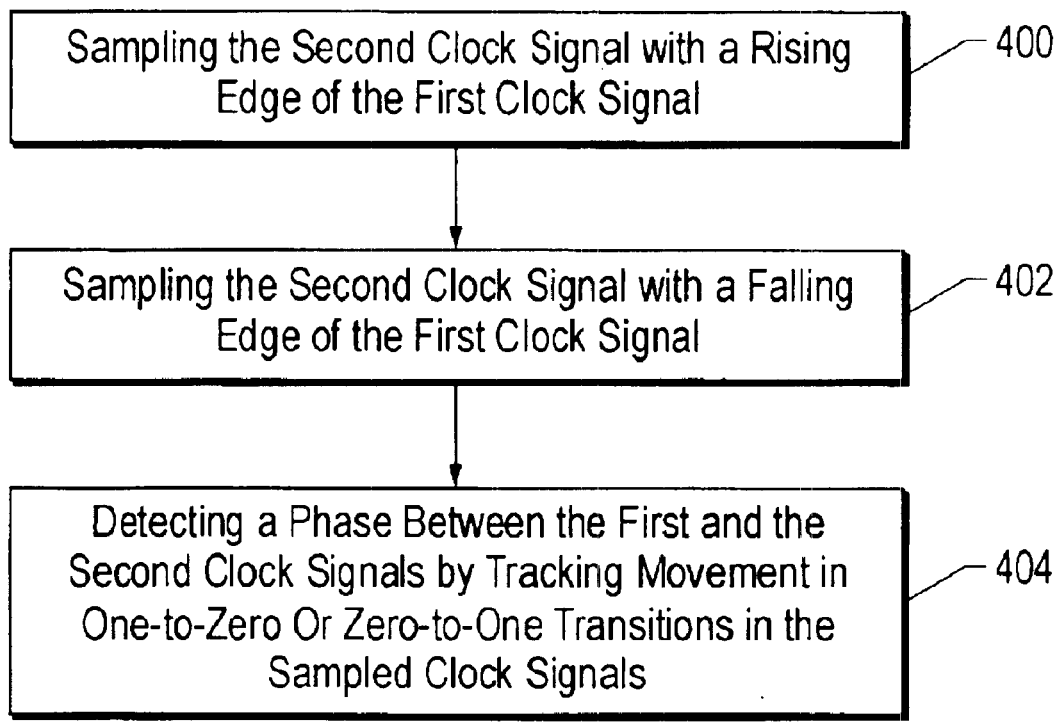
FIG. 4 depicts a flow chart of one embodiment of a phase detection method.

FIG. 4 depicts a method for detecting phase difference between a first clock signal and a second clock signal. At block 400, the second clock signal is sampled with a rising edge of the first clock signal. At block 402, the second clock signal is sampled with a falling edge of the first clock signal. The operation of sampling the second clock signal with a rising edge of said first clock signal may include sampling a bus clock signal with a rising edge of a core clock signal.

Similarly, the operation of sampling the second clock signal with a falling edge of the first clock signal may include sampling a bus clock signal with a falling edge of a core clock signal. It should be appreciated that operations of blocks 400 and 402 may occur in parallel. At block 404, a phase difference between the first clock signal and the second clock signal is determined by tracking movement in one-to-zero or zero-to-one transitions in the sampled clock signals. The detected phase difference may accordingly be forwarded to the core clock synchronizer controller as a logic state transition on the sampled clock signal that is indicative of the phase shift.

Although the invention has been particularly described with reference to certain illustrations, it is to be understood that the forms of the invention shown and described are to be treated as exemplary embodiments only. Various changes, substitutions and modifications can be realized without departing from the spirit and scope of the invention as defined by the appended claims.

What is claimed is:

1. A phase detector operable in a programmable clock synchronizer for effectuating data transfer between first circuitry disposed in a first clock domain and second circuitry disposed in a second clock domain, wherein said first clock domain is operable with a first clock signal and said second clock domain is operable with a second clock signal, said first and second clock signals having a ratio of N first clock cycles to M second clock cycles, where $N/M \geq 1$, comprising:
    at least one first flip flop operable to sample said second clock signal with a rising edge of said first clock signal, said at least one first flip flop thereby operating to generate a one-to-zero transition in a first sampled clock signal following coincident rising edges between said first and second clock signals; and
    at least one second flip flop operable to sample said second clock signal with a falling edge of said first clock signal, said at least one second flip flop operating to generate a zero-to-one transition in a second sampled clock signal following said coincident rising edges between said first and second signals,
    wherein a movement in one of said one-to-zero and zero-to-one transitions is operable to track a movement in said coincident rising edges corresponding to a phase difference between said first and second clock signals.

2. The phase detector as recited in claim 1, wherein said at least one first flip flop comprises two flip flops operable to sample said second clock signal with a rising edge of said first clock signal.

3. The phase detector as recited in claim 1, wherein said at least one second flip flop comprises two flip flops operable to sample said second clock signal with a falling edge of said first clock signal.

4. The phase detector as recited in claim 3, further comprising a third flip flop operable to sample an output of said two flip flops using said rising edge of said first clock signal.

5. The phase detector as recited in claim 1, wherein said sampled clock signals are operable to be forwarded to a core clock synchronizer controller.

6. The phase detector as recited in claim 1, wherein said sampled signals are operable to be forwarded to a cycle and sequence generator.

7. The phase detector as recited in claim 1, wherein said sampled clock signals are operable to be forwarded to a skew state detector.

8. The phase detector as recited in claim 1, wherein said first clock signal is a core clock signal.

9. The phase detector as recited in claim 1, wherein said second clock signal is a bus clock signal.

10. A phase detection method operable in a programmable clock synchronizer for effectuating data transfer between first circuitry disposed in a first clock domain and second circuitry disposed in a second clock domain, wherein said first clock domain is operable with a first clock signal and said second clock domain is operable with a second clock signal, said first and second clock signals having a ratio of N first clock cycles to M second clock cycles, where $N/M \geq 1$, comprising:
    sampling said second clock signal with a rising edge of said first clock signal to generate a first sampled clock signal;
    sampling said second clock signal with a falling edge of said first clock signal to generate a second sampled clock signal; and
    detecting a phase difference between said first clock signal and said second clock signal by tracking movement in one-to-zero or zero-to-one transitions in said sampled clock signals.

11. The method as recited in claim 10, wherein the operation of sampling said second clock signal with a rising edge of said first clock signal comprises sampling a bus clock signal with a rising edge of a core clock signal.

12. The method as recited in claim 10, wherein the operation of sampling said second clock signal with a falling edge of said first clock signal comprises sampling a bus clock signal with a falling edge of a core clock signal.

13. The method as recited in claim 10, further comprising the operation of forwarding at least one of said sampled clock signals indicative of the detected phase difference to a core clock synchronizer controller.

14. The method as recited in claim 10, further comprising the operation of forwarding at least one of said sampled clock signals indicative of the detected phase difference to a cycle and sequence generator.

15. The method as recited in claim 10, further comprising the operation of forwarding at least one of said sampled clock signals indicative of the detected phase difference to a skew state detector.

16. A phase detector operable in a programmable clock synchronizer for effectuating data transfer between first circuitry disposed in a first clock domain and second circuitry disposed in a second clock domain, wherein said first clock domain is operable with a first clock signal and said second clock domain is operable with a second clock signal, said first and second clock signals having a ratio of N first clock cycles to M second clock cycles, where $N/M \geq 1$, comprising:
    means for sampling said second clock signal with a rising edge of said first clock signal to generate a first sampled clock signal;
    means for sampling said second clock signal with a falling edge of said first clock signal to generate a second sampled clock signal; and
    means for detecting a phase difference between said first clock signal and said second clock signal by tracking movement in one-to-zero or zero-to-one transitions in said sampled clock signals.

17. The phase detector as recited in claim 16, wherein said means for sampling said second clock signal with a rising edge of said first clock signal comprises means for sampling a bus clock signal with a rising edge of a core clock signal.

18. The phase detector as recited in claim 16, wherein said means for sampling said second clock signal with a falling edge of said first clock signal comprises means for sampling a bus clock signal with a falling edge of a core clock signal.

19. The phase detector as recited in claim 16, further comprising means for forwarding at least one of said sampled clock signals indicative of the detected phase difference to a core clock synchronizer controller.

20. The phase detector as recited in claim 16, further comprising means for forwarding at least one of said sampled clock signals indicative of the detected phase difference to a cycle and sequence generator.

21. The phase detector as recited in claim 16, further comprising means for forwarding at least one of said sampled clock signals indicative of the detected phase difference to a skew state detector.

* * * * *